May 10, 1938.  E. A. TRUSSELL  2,116,589
WIRE-BOUND BOOK INCLUDING SHEET-BINDING MEANS AND BLANKS THEREFOR
Filed Aug. 25, 1934  3 Sheets-Sheet 1
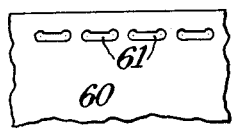
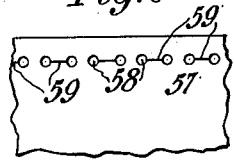
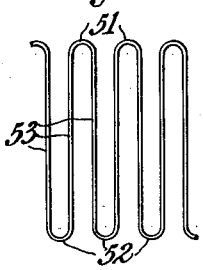
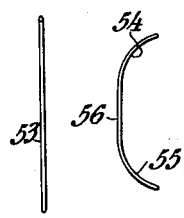
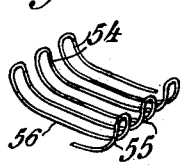
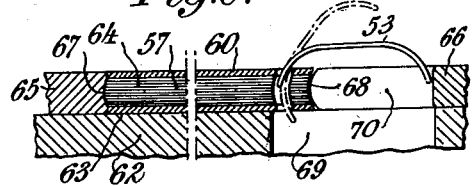
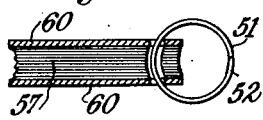
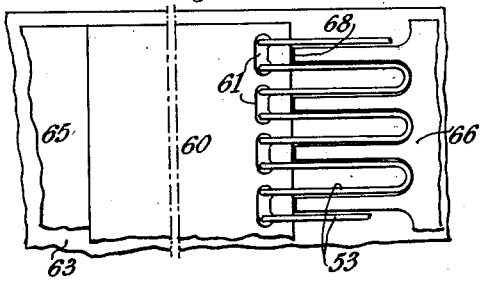
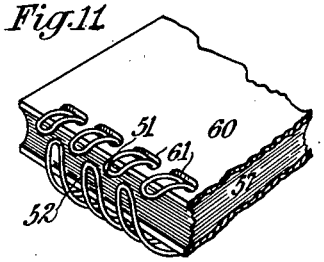
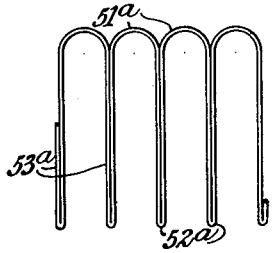
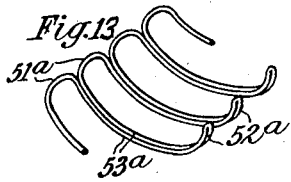
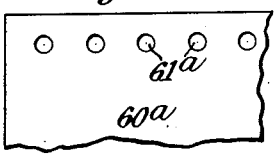
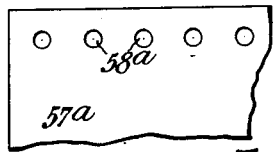
INVENTOR
Emory A. Trussell
BY Fraser, Myers & Manley
ATTORNEYS.

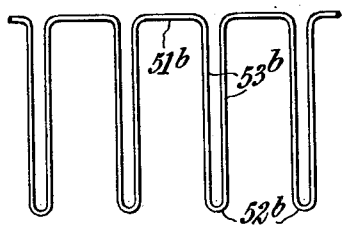
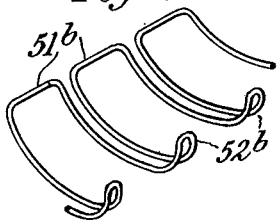
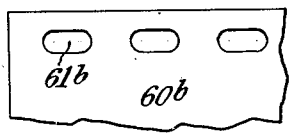
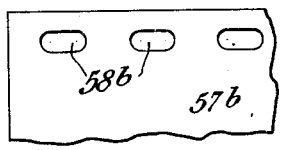
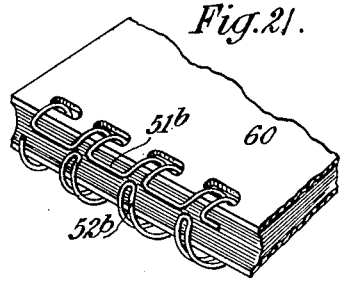
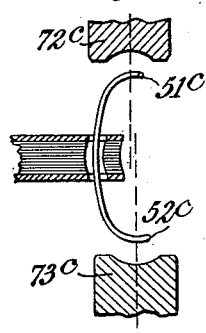
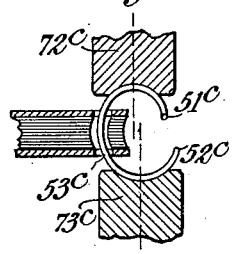
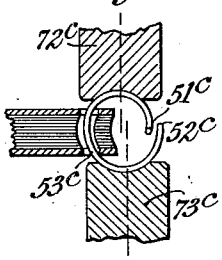
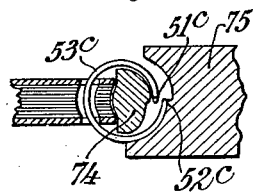
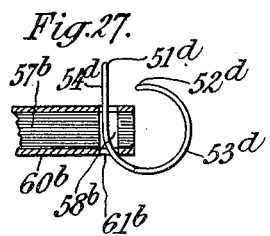
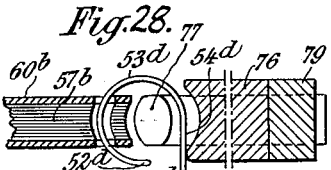
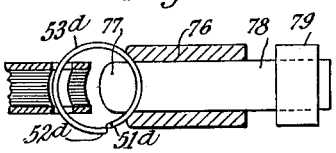
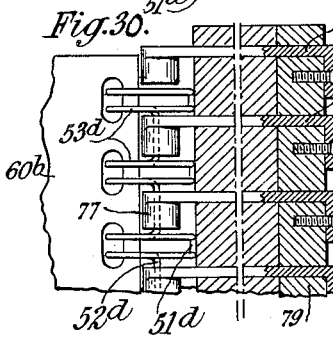
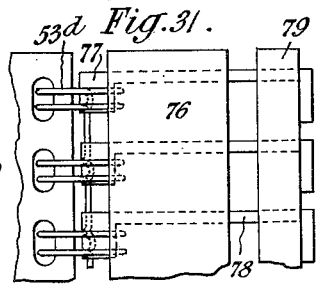

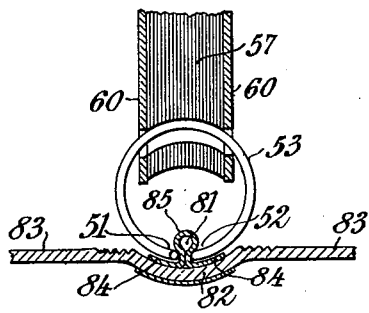
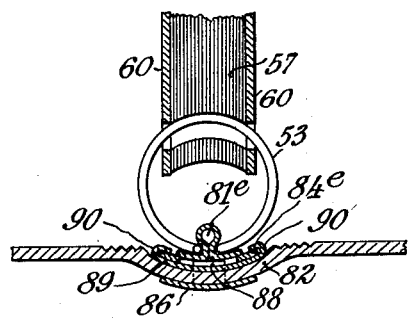
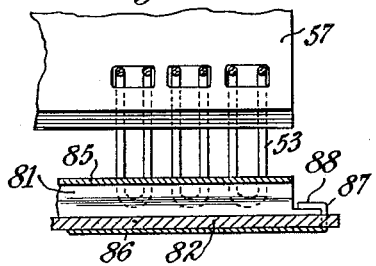
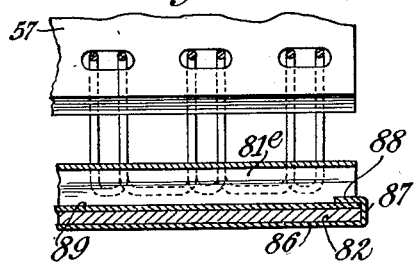
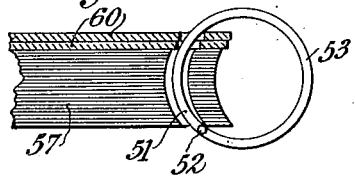
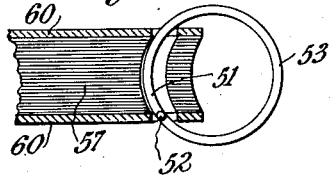
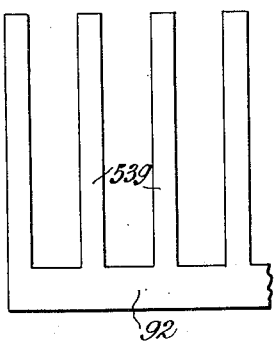
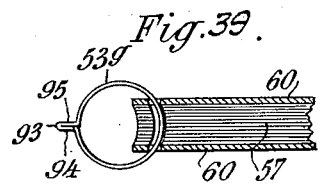

Patented May 10, 1938

2,116,589

UNITED STATES PATENT OFFICE 2,116,589

WIRE-BOUND BOOK INCLUDING SHEET-BINDING MEANS AND BLANKS THEREFOR

Emory A. Trussell, Milwaukee, Wis., assignor to Trussell Manufacturing Company, Poughkeepsie, N. Y., a corporation of New York Application August 25, 1934, Serial No. 741,360

17 Claims. (Cl. 281—25)

This invention relates to improvements in wire-bound books, metal sheet-binders, and blanks for such binders. Although of general application, the invention is particularly adapted for use in the binding of memorandum books, blank books, advertising pamphlets, printed books, and note books of the type commonly used by stenographers.

It is an object of the invention to provide a simple inexpensive book comprising sheets of thin material to be bound, including, if desired, surface sheets of heavier material to serve as covers, and a metal binder, preferably of wire, portions of which may be bent to forms such as may be readily thrust through perforations in the margins of the sheets to be bound and then further bent to forms such that the sheets may not be accidentally separated from the binder.

It is a further object of the invention to provide a book of the above described character consisting of a plurality of ring-bound sheets and a cover having attaching means by which the bound set of sheets and cover may be readily slipped into and out of engaging relation with each other, so that when one set of bound sheets have been used they may be removed from the cover and another set substituted.

The herein-disclosed improvements relating to methods of binding sheet material are not claimed in this application, but are disclosed and claimed in my copending divisional application, Serial No. 198,841, filed on or about March 30, 1938.

In the accompanying drawings illustrating the preferred and various modified forms of the invention as well as apparatus which may be useful in practicing the method:—

Figure 1 is a plan view of a piece of wire from which a binding element for a book may be made.

Fig. 2 is a like view of the wire after it has been bent to a form such as to provide a series of reversely disposed loops all lying in the same plane.

Fig. 3 is an end view of the bent wire illustrated by Fig. 2.

Fig. 4 is an end view of the bent wire illustrated by Figs. 2 and 3 after the portions of wire adjacent each set of loops have been bent to substantially circular form, so that the center line of the wire may lie in an imaginary surface of trough-like form.

Fig. 5 is a perspective view of the wire illustrated by Fig. 4.

Fig. 6 is a plan view of a fragmentary portion of a sheet of paper or other thin material, any reasonable number of which may be bound together by the wire illustrated by Figs. 4 and 5.

Fig. 7 is a plan view of a fragmentary portion of a sheet of heavier material, two of which may be used as covers for a plurality of sheets like the one illustrated by Fig. 6.

Fig. 8 is a transverse cross-sectional view through a pad of sheets and pair of covers to be bound, the partly formed binding wire, and fragmentary portions of some of the tools which may be used to facilitate the insertion of the binding wire.

Fig. 9 is a plan view of portions of the tools and partly formed book illustrated by Fig. 8.

Fig. 10 is a fragmentary, transverse, sectional view of the sheets, covers and binding wire after the bending of the wire has been completed and the book has been removed from the tools.

Fig. 11 is a perspective view of a fragmentary portion of a book comprising sheets, covers, and a completed binding wire.

Fig. 12 is a plan view of a piece of wire bent to a form adapted to serve as a blank from which a modified form of binding wire may be constructed.

Fig. 13 is a perspective view of the wire blank illustrated by Fig. 12 after it has been bent to a form such that the center line of the wire may lie in an imaginary surface of trough-like form.

Fig. 14 is a plan view of a fragmentary portion of a sheet of paper or other appropriate material adapted to serve as a leaf of a book to be bound by a wire-attaching element of a form which may be made from the blank shown in Fig. 12.

Fig. 15 is a like view of a fragmentary portion of a sheet of heavier material, a pair of which may be used as covers for a book having sheets like the one illustrated by Fig. 14.

Fig. 16 is a perspective view of a fragmentary portion of a completed book having a binding wire made from the blank illustrated by Fig. 12.

Fig. 17 is a plan view of a wire blank from which a second modified form of binding wire embodying the invention may be constructed.

Fig. 18 is a perspective view of the wire illustrated by Fig. 17 after it has been bent to a form such that the center line of the wire will lie in an imaginary surface of trough-like form.

Fig. 19 is a plan view of a fragmentary portion of a sheet of paper any reasonable number of which might be bound by a form of binding wire to be constructed from the blank illustrated by Fig. 17.

Fig. 20 is a fragmentary view of a sheet of heavier material, a pair of which may be used for covers of sheets to be bound by the binding wire made from the blank illustrated by Fig. 17.

Fig. 21 is a perspective view of a fragmentary portion of a finished book having a binding wire of the form to be made from the blank illustrated by Fig. 17.

Fig. 22 is transverse cross-sectional view of parts of a pad of sheets and covers, a partly formed binding wire, and parts of the dies used to complete the bending of the binding wire, the longitudinal axes of the dies being disposed slightly out of alignment with respect to each other as indicated by broken lines.

Fig. 23 is a like view of the parts illustrated by Fig. 22, the dies being indicated in positions assumed after they have partly completed the bending of the wire.

Fig. 24 is a like view of the parts illustrated by Figs. 22 and 23 after the bending has been completed and prior to the release of the binding wire.

Fig. 25 is a like view of the parts of the book illustrated by Figs. 22, 23 and 24 after being released from the wire-bending dies, the reversely disposed coils of the binding wire being represented between elements of a pair of aligning dies by which the sheet-attaching loops of the binding wire may be bent to a substantially circular form.

Fig. 26 is a perspective view of an intermediate form to which the blank illustrated by Fig. 17 may be bent and from which a binding wire like that illustrated by Fig. 21 may be constructed in accordance with a method of bending somewhat different from the methods thus far described.

Fig. 27 is a transverse cross-sectional view of a pad of sheets and a pair of covers, the binding wire being represented in the position which it assumes after the loops of relatively closed formation have been thrust through the marginal perforations in the sheets.

Fig. 28 is a like view of the parts illustrated by Fig. 27, the binding wire having been rotated through an angle of approximately 180 degrees, and a pair of wire-bending dies being indicated by means of which the bending of the binding wire may be completed.

Fig. 29 is a like view of the parts illustrated by Fig. 28, the dies having been moved to positions such as to complete the bending of the wire.

Fig. 30 is a view, partly in plan and partly in horizontal cross section, of the parts illustrated by Fig. 28.

Fig. 31 is a plan view of the parts illustrated by Fig. 29.

Fig. 32 is a transverse sectional view through parts of a wire-bound book illustrating one form of detachable connection between the binding wire and the book back.

Fig. 33 is a longitudinal sectional view through a portion of the book construction illustrated by Fig. 32.

Fig. 34 is a view similar to Fig. 32 illustrating a modified manner of detachably attaching a pad of wire-bound sheets to a book back.

Fig. 35 is a longitudinal sectional view of a part of the book construction illustrated by Fig. 34.

Fig. 36 is a transverse sectional view of parts of a pad of sheets and a pair of covers having the binding wire embodying the invention engaged therewith in a manner such that the portions of the wire which connect the sheet-attaching rings may be closed between one of the covers and the adjacent sheet.

Fig. 37 is a like view of the parts illustrated by Fig. 36, the two covers and the sheets being indicated in the positions in which they may be assembled to facilitate the insertion of the binding wire, after which one of the covers may be turned about the wire to the position indicated in Fig. 36.

Fig. 38 is a plan view of a blank which may be made from sheet metal and from which a modified form of ring binder embodying the invention may be constructed.

Fig. 39 is a transverse section of portions of the leaves and covers of a book attached together by a ring binder of a form which may be made from the blank illustrated by Fig. 38.

A wire-bound book of the form illustrated by Fig. 11 may be constructed in various ways, one of which will be described with the aid of Figs. 1 to 10, inclusive, of the drawings. Fig. 1 represents a piece of relatively soft wire 50, which may first be bent to the form of the blank illustrated by Figs. 2 and 3 comprising reversely disposed loops 51, 52 and intervening connecting portions 53 all lying in the same plane, as illustrated by Fig. 3. These loops may be bent to a form such that the center lines of all portions of the wire will lie in an imaginary surface of trough-like form as indicated in end view by Fig. 4. The form of the partly completed binding wire, as illustrated by Fig. 4, may comprise substantially circular portions 54, 55 and intervening straight portions 56. A short length of completed binding wire of the form illustrated by Fig. 4 is shown in perspective in Fig. 5 in readiness to be made use of in binding a number of sheets of a blank book, memorandum book, circular, printed publication, or similar leaved construction.

In Fig. 6 is illustrated a fragment of one of a number of sheets 57 of paper or other appropriate material, which may be bound together by the binding wire embodying the invention. Such sheets may be perforated along the edges to be bound in such manner as to provide for suitable interengagement with the binding wire. As indicated in Fig. 6 the sheet may be provided with perforations 58 spaced in accordance with the spacing of the sheet-attaching loops or rings of the binding wire hereinafter to be described, and in order that the attaching loops may be thrust through the sheets in the form of connected pairs, the sheets 57 may be slitted between adjacent perforations as at 59. It will be apparent, however, that any form of perforation of a shape and dimensions such as to accommodate a connected pair of sheet-attaching loops or rings may be substituted for the specific type of perforation illustrated by Fig. 6.

In Fig. 7 is illustrated a fragment of a sheet 60 of material appropriate for use as a protector or cover for a book or pad built up of the sheets 57. The cover sheet 60 is likewise indicated as being provided with perforations 61 of suitable form and dimensions to permit connected pairs of loops or rings of a binding wire to be thrust through them. In building up a book or pad, any desired number of sheets 57 may be superimposed one upon another, and, preferably, enclosed between a pair of sheets 60, after which the loops of the binding wire may be thrust through the registering perforations 58, 59, 61 of the sheets and covers and bent by the use of suitable dies to forms such as to hold the parts of the book in their assembled relation, as illustrated by Figs. 10 and 11.

In Figs. 8 and 9, are illustrated parts of certain tools which may be made use of as an aid in carrying out one method of inserting the loops of the binding wire in the perforations of the sheets and covers of the book and of bending them to their completed forms.

In Fig. 8, 62 represents a table or support having a flat top 63 on which the book or pad 64 comprising sheets 57 and covers 60 may be supported, and, while thus supported, they may be pressed edgewise between a pair of sheet-shifting tools 65, 66, the former having a concave sheet-engaging surface 67 and the latter a convex sheet-engaging surface 68. By gently pressing the two sheet-shifting elements 65, 66 towards each other, the sheets and covers will be adjusted as indicated in Fig. 8 to positions such that the perforated portions will be curved to an extent dependent upon the curvature of the surfaces 67, 68 of the sheet-shifting tools. This curvature may be made to conform substantially with the curvature of the portions 54, 55 of the partly formed binding wire, so that one set of the reversely disposed loops, that is, either the loops 51 or loops 52, may be readily thrust into the perforations, after which they may be closed by the use of suitable dies to the positions indicated in Fig. 10.

To facilitate the insertion of the partly formed binding wire in the perforations in the pad of sheets to be bound, an opening may be provided in the support, as at 69, and the tool 66 may be slotted, as at 70 (see Figs. 8 and 9).

It will be apparent that the finished binding wire affords a very simple and easily constructed and assembled, yet highly satisfactory, means whereby the sheets and covers of the book, if covers are used, may be attached together, after which either cover and any number of the sheets may be freely moved around the loops of the binding wire through approximately 360 degrees so that either page of any leaf of the book may be a surface page.

In Fig. 12 is disclosed a form of blank from which a modified form of binding wire embodying the invention may be constructed. The blank illustrated by Fig. 12 differs from the one illustrated by Fig. 2 in that the loops 52$^a$ are closed upon each other and the loops 51$^a$ are of a more open construction so that the intervening connecting wires 53$^a$ are disposed in spaced pairs, the wires of each pair being in contact with each other. If a book or pad is to be bound by a sheet-attaching device made from the blank illustrated by Fig. 12, the perforations 58$^a$ in sheets 57$^a$ (Fig. 14) and the perforations 61$^a$ in cover sheets 60$^a$ (Fig. 15) may be relatively small as compared with the spaces between said perforations, and, if desired, may be simple circular holes as indicated, each hole being merely of a diameter equal to two diameters of the wire plus a reasonable clearance space.

When using a blank of the form of the one illustrated by Fig. 12, the wires 53$^a$ may be first bent to the forms illustrated by Fig. 13 so that their center lines lie in an imaginary surface of trough-like form, after which the loops 52$^a$ may be thrust into the perforations 61$^a$ of the covers and 58$^a$ of the sheets, and the sheet-attaching loops formed by the wires 53$^a$ bent by suitable dies to the form of substantially closed sheet-attaching loops or rings, as clearly indicated in Fig. 16.

In Fig. 17 is illustrated a form of blank differing from those illustrated by Figs. 2 and 12 in that the loops 52$^b$ are of a relatively closed configuration as compared with the loops 51$^b$, the forms of the loops being such that the intervening wires 53$^b$ are all spaced from each other in pairs, none of the wires being in contact, but the wires of each pair being closer to each other than to the wires of adjacent pairs.

The blank illustrated by Fig. 17 may be bent to the form illustrated by Fig. 18 in which the centers of the wires 53$^b$ between the loops 52$^b$ and 51$^b$ lie in an imaginary surface of trough-like form, after which the loops 52$^b$ and portions of the connecting wires 53$^b$ may be thrust into perforations 58$^b$ in sheets 57$^b$ (Fig. 19) to be connected by the binding wire, and, if desired, through perforations 61$^b$ in cover sheets 60$^b$ (Fig. 20), and then bent by suitable wire-rolling dies until the sheet-attaching loops formed from the wires 53$^b$ assume the forms of substantially closed rings, as indicated in Fig. 21. When a binding wire of the form embodying the invention as disclosed by Figs. 17 to 21 is used, the perforations 58$^b$ and 61$^b$, as shown in Figs. 19 and 20, need be only of a size sufficient to accommodate a pair of the closely spaced wires 53$^b$, so that the spaces between a pair of perforations may be greater than the lengths of the perforations.

In Figs. 22 to 25, inclusive, are disclosed portions of tools which may be used as an aid in completing the bending of a binding wire embodying the invention. In accordance with one method which may be practiced with the aid of such tools the wire-rolling dies 72$^c$, 73$^c$, are disposed with their axes slightly displaced one with respect to the other as indicated by broken lines in Fig. 22. When the dies are moved towards each other, as indicated in Figs. 23 and 24, to roll the portions of wire 53$^c$ to their substantially closed, ring-like forms adapted to serve as sheet-attaching loops, the reversely disposed loops 51$^c$, 52$^c$ will be caused to overlap in a slightly offset relation, as indicated in Fig. 24, so that the loops of one set will not be crowded into the spaces between the loops of the other set and cause portions of the binding wire to be distorted. The relative movement of the dies 72$^c$ and 73$^c$ is continued until the looped portions 51$^c$, 52$^c$ have been caused to overlap to an extent only such that, when the dies are withdrawn and the bent portions of the wire relieved from strain, they will spring back to an extent such that the loops 51$^c$, 52$^c$ will assume the positions illustrated by Fig. 25, after which, if desired, the portions of the wire adjacent the loops 51$^c$, 52$^c$ may be bent between a pair of aligning dies 74, 75, which may be moved towards each other and thereby force the looped portions 52$^c$ into registration with, and even slightly beyond, the looped portions 51$^c$ to an extent such that when released from the dies the sheet-attaching loops formed by the portions 53$^c$ of the wire will be of substantially circular form, as indicated in Fig. 10.

It will be apparent that the methods of installing and completing the bending of the binding wire which have been described with the aid of Figs. 9, and 22 to 25 of the drawings are each equally adapted to be used in making binding wires of any of the three forms illustrated by Figs. 11, 16 and 21.

With the aid of Figs. 26 to 31, inclusive, another method in accordance with which a binding wire embodying the invention may be completed will be described. When this method is employed, a blank, which might, for example, be one like the blank illustrated by Fig. 17, may first be bent by suitable tools to the form illustrated by Fig. 26 comprising reversely disposed loops 51$^d$, 52$^d$ and intervening wire portions 53$^d$, parts 54$^d$ of the wire portions 53ᵈ being straight, as indicated, so as to lie in one and the same plane. It will be apparent that a similar partly completed binding wire might likewise be made from a blank of the form illustrated by Fig. 2 or from a blank of the form illustrated by Fig. 12. The loops 51ᵈ and adjacent portions 54ᵈ of the binding wire may be thrust through perforations 58ᵇ, 61ᵇ of sheets of paper 57ᵇ and cover plates 60ᵇ like those illustrated by Figs. 19 and 20, as indicated in Fig. 27, after which the partly formed binding wire may be rotated to the position with respect to the sheets and covers indicated in Fig. 28. The portions 54ᵈ of the binding wire may then be bent to the same substantially circular form as the portions 53ᵈ by pressing them between a die 76 and a series of dies 77 as indicated in Figs. 28 to 31, inclusive. The dies 77 may be supported in an offset relation at the ends of a series of supporting bars 78 by which they may be secured to a common operating bar 79 by screws 80 or other appropriate fastening means, as clearly shown in Fig. 30. The bars 78 may, as indicated, be passed through slots provided therefor in the die 76, so that the dies 77 may be moved towards the die 76 by forcibly drawing the operating bar 79 rearwardly or away from the body portion of the die 76 in order that the parts will assume the relative positions shown in Figs. 29 and 31. When using the dies 76, 77, to bend the parts 54ᵈ of the binding wire to circular form, the operating bar 79 will first be moved towards the body portion of the die 76 so as to separate the dies 76 and 77. The book and partly formed binding wire will then be moved to a position relative to the bending tools illustrated by Figs. 28 and 30, after which relative movements may be imparted to the book and tools such as to cause the dies 77 to enter the partly formed sheet-attaching rings of the binding wire. The common operating bar 79 may then be moved away from the rear body portion of the die 76, thus causing the dies 77 to bend the parts 54ᵈ of the binding wire into the concave face portion of the die 76 as indicated in Figs. 29 and 31. If desired, the forms of the dies 76, 77 may be such as to slightly overbend the portions of wire 54ᵈ, as indicated by Fig. 29, in order that when released from the dies the attaching loops will be of the true circular form illustrated by Fig. 10. The release of the finished binding wire from the dies is effected by moving the operating bar 79 towards the rear portion of the die 76 and then imparting a relative lateral movement to the book and tools in order to remove the dies 77 from the attaching loops.

The forms of blanks and partly completed sheet binders illustrated by Figs. 2, 4, 5, 8, 12, 13, 17, 18, 22, 26, 27 and 28 are, to a certain extent, intended to be diagrammatic only. The drawings and descriptions of these wire structures are intended to indicate that parts of the wire may first be bent to the approximate curvature of the sheet-attaching rings of a finished binder and the bending completed after the blank or partly finished binder has been assembled with sheets to be bound. The curvature and relative proportions of the parts of the blanks to be bent before assembling the blanks with the sheets and the relative portions of the unbent or incompletely bent portions relied upon to maintain the ends of the sheet-attaching loops or rings spaced sufficiently to permit the sheets to be assembled with the binder may be varied to suit conditions to be met in practice. It is not essential that so great a portion of the wires from which the sheet-attaching rings or loops are to be formed be left straight or substantially straight as is indicated in the drawings. All that is necessary is that the form of the partly completed rings be such as to permit the sheets to be inserted between the spaced ends of the rings. By bending a relatively large portion of each ring to the substantial curvature of the intended completed ring before assembling the binder with the sheets to be bound and by using appropriate dies to complete the bending of the rings, binders having sheet-attaching rings or loops of substantially circular form may be readily formed.

In each of the various forms of blanks which have been illustrated for use in making sheet binders embodying the invention it will be observed that one pair of corresponding ends of the two wires which pass through the same perforations in the sheets assembled with the binder are united by a rounded portion such as to cause the connected ends of the wires to converge, and that the opposite ends of the same wires are connected with adjacent ends of wires of adjacent pairs by uniting portions of a curved form such as to cause the parts of the wires approaching the connections between wires of different pairs to diverge or flare away from each other so that when the pairs of wires which form the sheet-attaching loops or rings are bent to their closed positions the converging end portion of the pair of mutually united wires which serve as a double sheet-attaching ring or loop may be caused to extend into the space between the diverging or outwardly flared portions of the opposite ends of the same wires where they are united with wires of adjacent rings without spreading or crowding said rings, so that the alternate ring-uniting portions of the finished binder will be arranged in an overlapping, zigzag relation such as to prevent the separation of sheets from the binder along the zone of adjacent overlapping ring ends.

As indicated by Figs. 32 and 33, a pad of sheets 57 with a pair of heavier protective sheets 60, if desired, and a binding wire 51, 52, 53 may be provided with an attaching element 81 by which the pad and binding wire may be secured to the back 82 and covers 83 of a binder of leather or other suitable material. This attaching member 81 may comprise a plate of metal having portions 84 to be secured to the book back and an upstanding undercut rib 85 to be held in engagement with the looped portions 51, 52 of the binding wire. The attaching element 81 may, if desired, be permanently secured to the binder back 82, as indicated in Fig. 33, by means of a back plate 86 having end tabs 87 thrust through the book back and turned over, as at 88, into engaging relations with the ends of the attaching portions 84 of the member 81. The beaded rib 85 may be so positioned as to be unobstructed at its ends so that the pad and binding wire may be moved endwise with respect to the rib in order to engage and disengage the binding wire and attaching element 81, or, if desired, the rib may be of a cam-like form in cross section, as indicated in Fig. 32, so that the binding wire may be sprung into and out of engagement with the attaching element 81 by movements of the sheet-attaching loops directly towards or away from the rib in a direction perpendicular to the book back. To effect an engagement between the sheet binder and the rib of the attaching element, all that is necessary is to spread the parts of the binder at one end sufficiently to snap them over the rib, after which the remaining parts may be successively snapped over the rib by merely pressing successive portions of the binder towards the rib beginning with the end which has already been engaged.

As an alternative form of securing the pad and binding wire to the binder back 82, the binder back may, as illustrated by Figures 34 and 35, be provided with an attaching plate 89, preferably of channel-like form in cross section, having overhanging marginal flanges 90. The plate 89 may be secured to the binder back by the back plate 86 and tabs 87 having their ends 88 turned over the end portions of the channeled attaching plate 89. When the binder cover is provided with the attaching plate 89, the attaching element 81e need not be removed from the binding wire. The pad, binding wire and attaching element 81e may be attached to and detached from the binder back and covers by sliding the element 81e into its engaging relation with the channeled plate 89. To facilitate the connection of the attaching plate 81e and channeled plate 89, the attaching element 81e may be provided with slightly offset marginal flanges 84e to extend into the portions of the channel underlying the overhanging flanges 90, as indicated in Fig. 34.

If a pad of sheets and cover elements 57, 60 are assembled with a binding wire 51, 52, 53 in the manner hereinbefore described, the looped portions 51, 52 will be exposed when the cover elements 60 are in contact with the outermost sheets 57 of the pad. If desired, the parts may be assembled with the two cover elements 60 in contact with each other at one surface of the pad of sheets 57, as indicated in Fig. 37, in which case the looped portions 51, 52 will be exposed after the binding wire has been completed. One of the cover elements 60 may be then turned about the portions 53 of the binding wire through approximately 360 degrees to the position indicated in Fig. 36 with the looped portions 51, 52 between one of the covers 60 and the adjacent sheet 57. The looped portions of the binding wire will then be concealed when the book is closed. It will be apparent that the sheets and covers may be so assembled that the looped portions 51, 52 may be between any desired pair of sheets 57 except when the book has been opened so as to separate those particular sheets.

In Fig. 38 is illustrated a blank which may be stamped from a piece of suitable sheet metal and which may comprise a series of fingers 53g and a connecting and supporting strip 92. The fingers 53g either while in the flat or after first being bent to open looped form similar to that of the first bending of the blanks previously described, as indicated in Figs. 5, 13, 18 and 26, may be thrust through perforations in the sheets 57, 60 (Fig. 39) and bent to the form indicated by suitable tools. Before inserting the binder in the perforations in the sheets, the strip 92 may, if desired, be bent upon itself to the form shown at 93, the portion 94 at the fold being slightly narrower than the portion 95 in order to provide an angular recess adapted to receive the free ends of the fingers 53g as indicated. It will be observed that the thickness of the folded, outwardly extended rib at 93 is only twice the thickness of the metal from which the fingers 53g are made, measured circumferentially, so that the rib affords little or no material obstruction to the movement of the covers and sheets about the ring in such manner that any two oppositely disposed pages may be so shifted as to be surface pages.

Although the binding wire has been herein disclosed as one extending substantially from one end to the other of the margins of the sheets to be bound, it will be apparent that its length and the number of loops to be used need be only such as is necessary to adapt it to satisfactorily serve the intended purpose, and that, if desired, binding wires of a given size and weight might be made up in standard lengths including a plurality of pairs of sheet-attaching loops, and any number of such binding wires used in an end-to-end relation along the margins of the sheets to be attached dependent upon the sizes of the sheets. It is not at all essential that a single wire comprising a single series of pairs of loops extend the entire length of the sheets. The pads of sheets with or without cover elements may be bound with wire and sold as completed units, or partly completed binding wires similar to those illustrated by Figs. 2, 5, 12, 13, 17, 18 and 26 may be sold with tools adapted for use in perforating sheets to be bound and tools for completing the binding wires after they have been inserted in the sheets, so that the binding wires may quite generally be used in binding written, printed, ruled or blank material of any character.

It is not intended that the invention be limited to the preferred forms of wire-bound books and methods of making them which have been herein selected for purposes of illustration, but that it should include modifications and variations other than those specifically illustrated and described within the scope of the appended claims.

What is claimed is:—

1. A wire-bound book comprising sheets of material having correspondingly spaced perforations along edges to be bound and a bent wire binding element comprising a series of reversely disposed loops having their mutually connected portions intermediate their outer end portions of curved forms in planes perpendicular to and spaced along a common axis so as to constitute sheet-attaching rings, the end portions of the loops being so disposed as to form a series of connecting elements lying adjacent one another in succession along a zone parallel with the bound margins of the sheets and an attaching plate having an undercut rib extending lengthwise thereof of a cross-sectional form such that it may be snapped directly into engagement with the binding wire by pressing its upper portion between the alternate reversely disposed loops and permit them to spring into an engaging relation with the underlying portions, the attaching plate serving as a means whereby the binding wire and any sheets bound by said wire may be secured to a book back.

2. A sheet binder comprising a long, slender, continuous, bent strip of appropriate material having connected spaced pairs of parallel elements all lying in the same plane, one pair of corresponding ends of the elements of each pair being mutually united and the opposite ends of the elements of each pair being flared outwardly and united with corresponding ends of adjacent elements of adjacent pairs, the pairs of elements being adapted to be bent to forms such as to serve as sheet-attaching rings and to have their mutually united ends extended into the spaces between their opposite, flared ends in an alternate, overlapping, zigzag relation.

3. A book comprising sheets having correspondingly spaced perforations along corresponding margins and a sheet binder comprising spaced pairs of rings having their axes in alignment, the successive pairs of rings being passed through successive perforations in said sheets, one pair to each perforation, and the rings passing through the same perforation having one pair of corresponding ends united with each other and their opposite ends flared outwardly and united respectively with corresponding ends of the adjacent rings passing through adjacent perforations, the united ends of rings passing through the same perforations being extended into the spaces between their opposite outwardly flaring ends in an alternate, overlapping, zigzag arrangement so as to prevent the separation of sheets from the binder along the zone of union of the ends of the rings.

4. The combination, with a sheet binder having a pair of united, circular, spaced, closed sheet-attaching rings, of a plurality of superimposed sheets having registering, oblong, marginal holes of which the longest diameters are parallel with the margins to be bound, the two rings of the binder being passed through opposite end portions of a single oblong hole in each sheet.

5. The combination, with a sheet binder having a series of united, circular, spaced, closed sheet-attaching rings, of a plurality of superimposed sheets having registering marginal holes each having a bounding portion substantially parallel with the nearest margin of the sheet, the lengths and spacing of the holes being such that successive pairs of spaced rings of the binder may pass through successive spaced holes in the sheets, one pair of rings to each set of registered holes.

6. A ring book comprising sheets having oblong holes spaced along corresponding margins and sheet-binding means comprising united, circular, spaced, closed, rings passed in pairs through said holes, two spaced rings to each hole.

7. A sheet binder comprising a continuous zigzag strip of appropriate material having spaced pairs of spaced parallel elements all lying in the same plane, each element intermediate the two end elements being united at one of its ends to one of its two adjacent elements and at its opposite end to the other, each of the pairs of elements being adapted to be bent to a form such as to serve as a pair of united, spaced, sheet-attaching rings of the binder.

8. A sheet binder, as defined by claim 7, of which the parts of the strip by which the elements are united are of forms such that each pair of elements will converge at their mutually united ends and diverge at the ends at which they are united with elements of adjacent pairs, whereby when the parts of the binder are bent to their finished forms the converging united ends of pairs of elements may extend into the diverging spaces where said elements are united with adjacent elements in an alternate, overlapping, zigzag arrangement.

9. A binding for a plurality of sheets provided with registering perforations along one margin comprising a strip of metal bent at intervals throughout its length to form a series of open loops alternating with alined sections forming a discontinuous longitudinal body portion, said loops extending through the perforations in said sheets and being curved upon themselves to bring their free ends into the gaps formed by said loops in the longitudinal body portion of said strip.

10. A book comprising sheets having correspondingly spaced perforations along corresponding margins and a sheet binder comprising spaced pairs of spaced rings having their axes in alignment, the successive pairs of rings being passed through successive perforations in said sheets, one pair to each perforation, and the rings passing through the same perforation having one pair of corresponding ends united with each other and their opposite ends united respectively with corresponding ends of the adjacent rings passing through adjacent perforations, of which the parts of the binder by which the rings are united are of forms such that each pair of rings will converge at their mutually united ends and diverge at the ends at which they are united with ends of rings of adjacent pairs, the converging ends of mutually united pairs of rings being extended into the divergent spaces at their opposite ends in an alternate, overlapping, zigzag relation such as to prevent the separation of sheets from the binder along the zone of union of the ring ends.

11. A wire-bound book comprising sheets of material having correspondingly spaced perforations along corresponding edges and a wire binder consisting of a plurality of pairs of discontinuous sheet-attaching rings disposed crosswise with respect to a common axis with their corresponding ends in a straight line parallel therewith; the ends of the rings of each pair, comprising one of the two sets of corresponding ring ends, being connected with each other, and each of the opposite ends of the rings of each pair, with the exception of the two end rings of the binder, being connected with the corresponding end of the nearest ring of an adjacent pair; the mutually united ends of each pair of rings being in a slightly overlapped relation with respect to the ends which are united with the ends of rings of adjacent pairs; the sheets of the book being assembled with the binder by having the rings extended through the registering perforations, one pair to each perforation, and the parts being so dimensioned that the rings may have loose engagement with the perforated edge portions of the sheets.

12. A wire-bound book, as defined by claim 11, of which the sheet-attaching rings of the spaced pairs are spaced from each other.

13. A book comprising sheets having correspondingly spaced perforations along corresponding margins and a sheet binder comprising spaced pairs of approximately circular, united, spaced, closed rings having their axes in alignment, the successive pairs of rings being passed through successive perforations in said sheets, one pair to each perforation, and the rings passing through the same perforation having one pair of corresponding ends united with each other and their opposite ends, except as to the two end rings of the binder, united respectively with corresponding ends of adjacent rings passing through adjacent perforations.

14. A sheet binder comprising a long, slender, continuous strip of appropriate material bent to form a series of spaced pairs of partly closed sheet-attaching elements disposed respectively in a side-by-side, parallel relation; those ends of each pair of elements, which are members of one of the two sets of corresponding element ends, being connected with each other, and each of the elements of each pair, except the two end elements of the binder, being connected at its other end with the corresponding end of an element of the next adjacent pair; material portions of the sheet-attaching elements being bent to a curvature such as to closely approximate that of a closed, substantially circular, ring-like element of an assembled binder, the remaining portions, also of material extent, being of shapes such as to require additional bending to cause them to have approximately the same curvature as that of the first-mentioned portions.

15. A sheet binder, as defined by claim 14, of which the ends of the sheet-attaching elements opposite their mutually united ends are divergent, the binder being thus adapted, when the pairs of elements are closed, to have their mutually united ends extended between their opposite divergent ends in an alternate, overlapping, zigzag relation.

16. A sheet binder, as defined by claim 14, of which the end portions of the sheet-attaching elements are bent to a curvature such as to conform with that of a closed element of an assembled binder and of which portions intermediate the end portions are of shapes such as to require additional bending to cause them to be of a curvature approximately equal to that of the end portions.

17. A sheet-binder, as defined by claim 14, of which the two sheet-attaching elements of each spaced pair are spaced from each other.

EMORY A. TRUSSELL.